United States Patent
Kuramoto

[19]

[11] Patent Number: 6,050,918
[45] Date of Patent: Apr. 18, 2000

[54] CONTROLLER AND CONTROL METHOD OF ELECTRIC PUMP FEEDBACK CONTROLLED AS A FUNCTION OF DRAIN FLOW RATE FOR A CONTINUOUSLY VARIABLE TRANSMISSION

[75] Inventor: Hiroaki Kuramoto, Yokosuka, Japan

[73] Assignee: Nissan Motor Co., Ltd., Yokohama, Japan

[21] Appl. No.: 09/292,934

[22] Filed: Apr. 16, 1999

[30] Foreign Application Priority Data

Apr. 17, 1998 [JP] Japan .................................. 10-107855

[51] Int. Cl.[7] .................................................. G05D 16/00
[52] U.S. Cl. .......................................... 477/157; 417/44.3
[58] Field of Search ................................ 417/44.3, 44.2, 417/43; 477/157

[56] References Cited

U.S. PATENT DOCUMENTS

| | | | |
|---|---|---|---|
| 5,520,517 | 5/1996 | Sipin | 417/44.3 |
| 5,664,937 | 9/1997 | Takahashi et al. | 417/44.2 X |
| 5,669,761 | 9/1997 | Kobayashi | 477/157 X |
| 5,670,852 | 9/1997 | Chipperfield et al. | 318/280 |

FOREIGN PATENT DOCUMENTS 6-138954  5/1994  Japan .

*Primary Examiner*—Khoi Q. Ta
*Attorney, Agent, or Firm*—Foley & Lardner

[57] ABSTRACT

When the pressure of a discharge fluid of an electric pump (1) exceeds a predetermined relief pressure, relief valve (6) discharges a part of the fluid to a drain passage (5). A sensor (8, 10, 11) detects a drain flowrate of the drain passage (5), and feedback control of the rotation speed of the electric pump (1) is performed so that the drain flowrate coincides with a predetermined flowrate. Due to this feedback control, the necessary fluid pressure is maintained while suppressing the drain flowrate to the minimum.

10 Claims, 5 Drawing Sheets

CONTROLLER AND CONTROL METHOD OF ELECTRIC PUMP FEEDBACK CONTROLLED AS A FUNCTION OF DRAIN FLOW RATE FOR A CONTINUOUSLY VARIABLE TRANSMISSION

FIELD OF THE INVENTION

This invention relates to improvement of a controller which aims to reduce the power consumption of an electric pump.

BACKGROUND OF THE INVENTION

Regarding feedback control of electric pumps, Tokkai Hei 6-138954 published by the Japanese Patent Office in 1994 discloses feedback control of the rotation speed of an electric pump so that the pump discharge pressure coincides with a target discharge pressure. Due to this control, the power consumption required to obtain the necessary discharge pressure can be suppressed.

SUMMARY OF THE INVENTION

Generally, relief valves are used to supply a constant hydraulic pressure regardless of load fluctuation in a hydraulic circuit, and for ensuring safety of the hydraulic circuit by limiting the maximum pressure in the circuit. However, when an electric pump is feedback controlled as in the prior art, a relief valve cannot be used in the discharge passage of the pump for the following reasons.

If the rotation speed of the electric pump is insufficient, the discharge pressure falls below the relief pressure of the relief valve. In this case, a difference arises between a target discharge pressure and a detected discharge pressure, and the control circuit increases the rotation speed of the electric pump based on this deviation. As a result, due to the relief action of the relief valve, the detected pressure in the pressure passage is always kept at the relief pressure even if the pump discharge pressure exceeds the relief pressure. When the target pressure in the discharge passage is set in the vicinity of the relief pressure, the difference of the target discharge pressure of the pressure passage and detected pressure of the same is almost zero regardless of the rotation speed of the electric pump as long as it is above a fixed rotation speed, and hence feedback control of the pump rotation speed does not work correctly. In other words, in this control, excess rotation speed of the electric pump cannot be corrected.

It is therefore an object of this invention to prevent excess rotation of an electric pump provided with a relief valve.

In order to achieve the above object, this invention provides a controller of an electric pump for discharging a pressurized fluid, comprising a relief valve provided with a drain for draining part of the pressurized fluid when the pressure of the pressurized fluid exceeds a predetermined relief pressure, a sensor for detecting a drain flowrate of the drain, and a microprocessor programmed to feedback control a rotation speed of the electric pump so that the drain flowrate coincides with a predetermined target flowrate.

This invention also provides a control method of an electric pump for discharging a pressurized fluid, comprising draining part of the pressurized fluid via a relief valve when a pressure of the pressurized fluid exceeds a predetermined relief pressure, detecting a drain flowrate of the relief valve, and feedback controlling a rotation speed of the electric pump so that the drain flowrate coincides with a predetermined target flowrate.

This invention also provides a hydraulic pressure controller of a continuously variable transmission of such a vehicle that is provided with a clutch. The controller comprises an electric pump comprising a discharge passage for discharging a pressurized fluid and a line pressure control valve provided in the discharge passage. The line pressure control valve supples part of the fluid to the continuously variable transmission. The controller further comprises a relief valve provided downstream of the line pressure control valve in the discharge passage. The relief valve comprises a drain passage for draining part of the pressurized fluid so as to maintain the pressure of the discharge passage downstream of the line pressure control valve at a predetermined relief pressure while supplying part of the pressurized fluid to the clutch. The controller further comprises a sensor for detecting a flowrate of the drain passage, and a microprocessor programmed to calculate a feedback correction value of the rotation speed of the electric pump based on a difference between the flowrate of the drain passage and a predetermined flowrate, and control the rotation speed of the electric pump based on the feedback correction value.

The details as well as other features and advantages of this invention are set forth in the remainder of the specification and are shown in the accompanying drawings.

DESCRIPTION OF THE PREFERRED EMBODIMENTS

Figure 1:
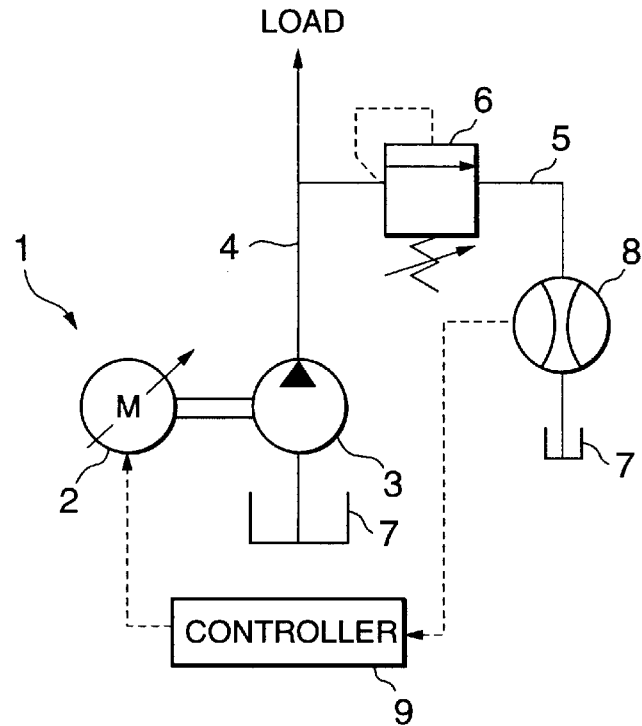
FIG. 1 is a schematic diagram of an electric pump controller according to this invention.

Referring to FIG. 1 of the drawings, an electric pump 1 comprises an electric motor 2 and pump 3.

The electric pump 1 aspirates and pressurizes fluid in the tank 7 according to the rotation of an electric motor 2, and discharges to a pressure passage 4 leading to a load.

A drain 5 is connected to the pressure passage 4 via a relief valve 6. The fluid which flows into the drain 5 is recirculated to the tank 7. A flowrate sensor 8 is provided midway in the drain 5. The relief pressure of the relief valve 6 is set to a value slightly larger than a target pressure to be exerted on the load. The drain flowrate Qd detected by the flowrate sensor 8 is input as a signal to a controller 9. The controller 9 controls the rotation speed of the electric motor 2 based on the drain flowrate Qd detected by the flow sensor 8. The electric motor 2 varies the rotation speed according to an output signal of the controller 9.

The controller 9 comprises a microcomputer comprising a central processing unit CPU, random access memory RAM, read-only memory (ROM) and input/output (I/O) interface.

Figure 2:
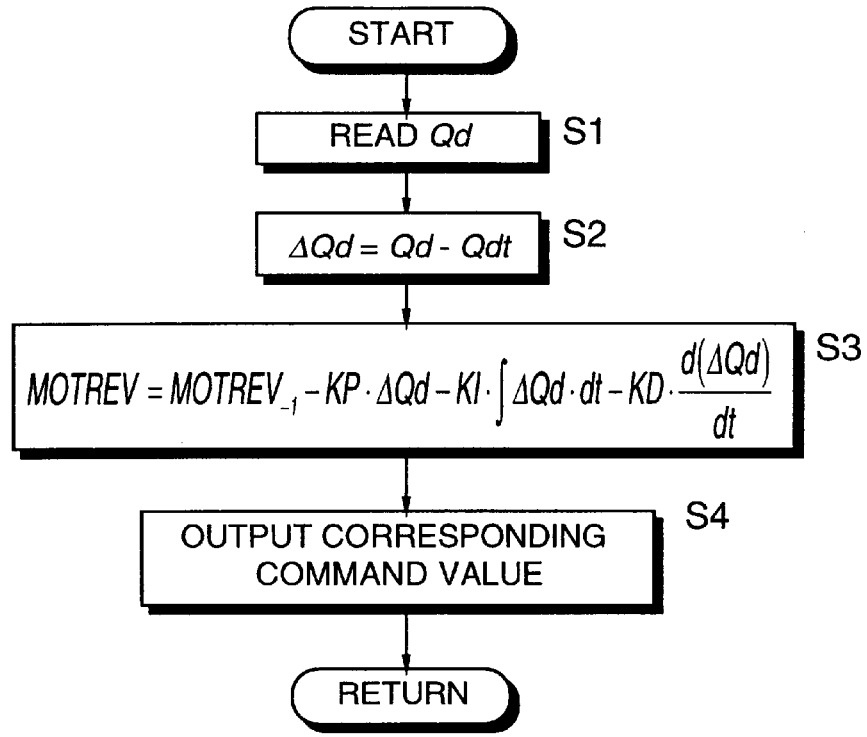
FIG. 2 is a flowchart describing an electric pump rotation speed control process performed by the controller according to this invention.

The controller 9 performs feedback control of the rotation speed of the electric motor 2 by performing a routine shown in FIG. 2. This routine is executed at a fixed interval of 10 milliseconds, for example.

In a step S1 of the routine, a drain flowrate Qd detected by the flowrate sensor 8 is read.

In a step S2, a deviation ΔQd of a detected drain flowrate Qd from a predetermined target drain flowrate Qdt is calculated.

In a step S3, a target rotation speed MOTREV is calculated based on this deviation ΔQd so that the drain flowrate Qd coincides with the target value Qdt, and the calculated target rotation speed MOTREV is output to the electric motor 2. This calculation is performed by the following equation based on proportional integral differential control (PID control).

$$MOTREV = MOTREV_{-1} - KP \cdot \Delta Qd - KI \cdot \int \Delta Qd \cdot dt - KD \cdot \frac{d(\Delta Qd)}{dt}$$

where, $MOTREV_{-1}$=target rotation speed on immediately preceding occasion process was executed, KP=feedback gain of a proportional amount,
KI=feedback gain of an integral amount, and
KD=feedback gain of a differential amount.

In a step S4, the calculated target rotation speed is output to the electric motor 2.

As a result, when the drain flowrate Qd exceeds the target value, the rotation speed of the electric motor 2 decreases, and when the drain flowrate Qd is less than the target value Qdt, the rotation speed of the electric motor 2 increases. The target value Qdt of the drain flowrate is set to the minimum flowrate at which the relief valve 6 can operate stably, e.g. about 1000 cc/min.

In this way, the controller 9 maintains the fluid pressure acting on the load equal to the relief pressure, while preventing the drain flowrate of the relief valve 6 from becoming excessive. The power consumption of the electric motor 2 can therefore be suppressed to a minimum.

In applications where the fluid amount required by the load increases sharply, by setting the target value Qdt of the drain flowrate large, temporary drop of discharge pressure due to a response delay of the electric motor 1 can be avoided.

Figure 3:
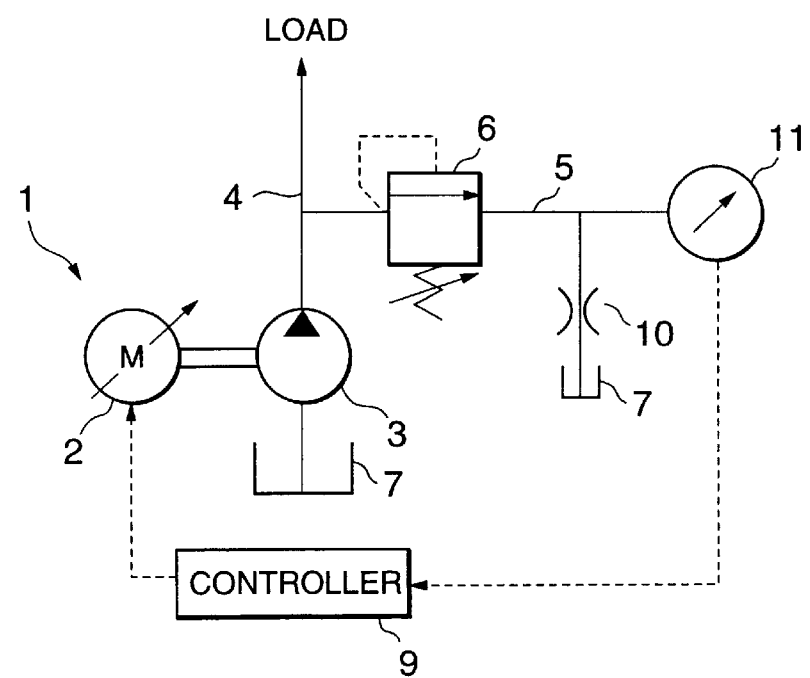
FIG. 3 is similar to FIG. 1, but showing a second embodiment of this invention.

Next, a second embodiment of this invention will be described referring to FIGS. 3 and 4.

In this embodiment, an orifice 10 is provided in the drain passage 5 downstream of the relief valve 6 instead of the flowrate sensor 8, and the drain pressure Pd between the relief valve 6 and orifice 10 is detected by a pressure sensor 11.

Figure 4:
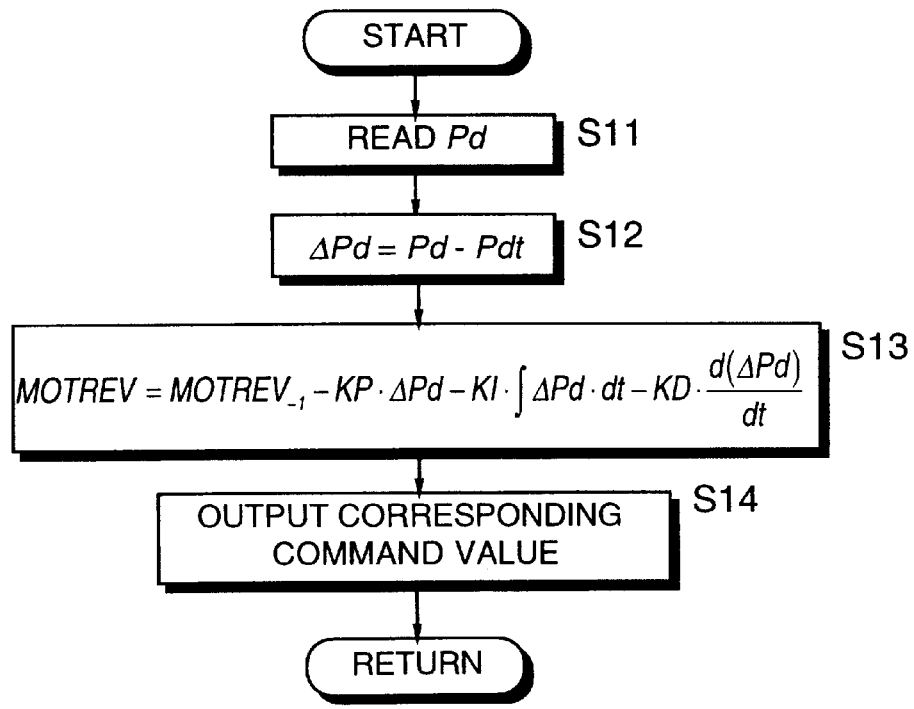
FIG. 4 is similar to FIG. 2, but showing the second embodiment of this invention.

In this case, the controller 9 feedback controls the rotation speed of the electric motor 2 based on a deviation ΔPd of drain pressure Pd from a target. pressure Pdt instead of the drain flowrate, and therefore, in the process of FIG. 4, steps S11–S13 are provided instead of the steps S1–S3.

In a step S11, a detected pressure Pd by the pressure sensor 11 is read. In a step S12, a deviation ΔPd of the detected pressure Pd from a target pressure Pdt is calculated. In a step S23, a target rotation speed MOTREV of the electric motor 2 is calculated based on the following equation for proportional integral differential control (PID control). In a step S4, a signal corresponding to the target rotation speed MOTREV is output to the electric motor 2.

$$MOTREV = MOTREV_{-1} - KP \cdot \Delta Pd - KI \cdot \int \Delta Pd \cdot dt - KD \cdot \frac{d(\Delta Pd)}{dt}$$

where, $MOTREV_{-1}$=target rotation speed on immediately preceding occasion process was executed, KP=feedback gain of a proportional amount,
KI=feedback gain of an integral amount, and
KD=feedback gain of a differential amount In general, the pressure sensor 11 is less expensive than the flowrate sensor 8, hence according to this embodiment, the cost of implementing the invention is less than in the aforesaid first embodiment.

Next, third and fourth embodiments of this invention will be described referring to FIGS. 5 and 6.

Figure 5:
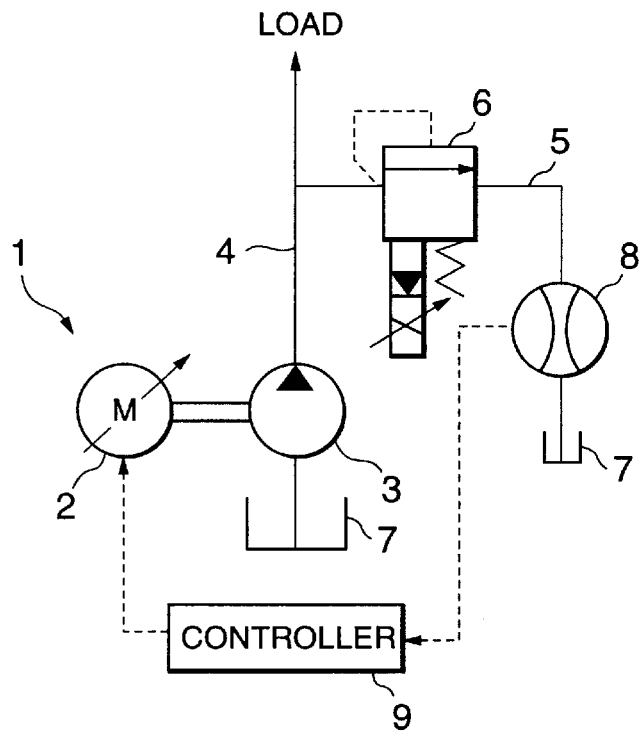
FIG. 5 is similar to FIG. 1, but showing a third embodiment of this invention.

The third embodiment shown in FIG. 5 is a case where the relief pressure of the relief valve 6 is made to be variable in the aforesaid first embodiment. The relief valve 6 comprises a duty solenoid for this purpose, and the relief valve 6 varies a valve opening pressure by the magnetic force of a duty solenoid according to an input signal.

Figure 6:
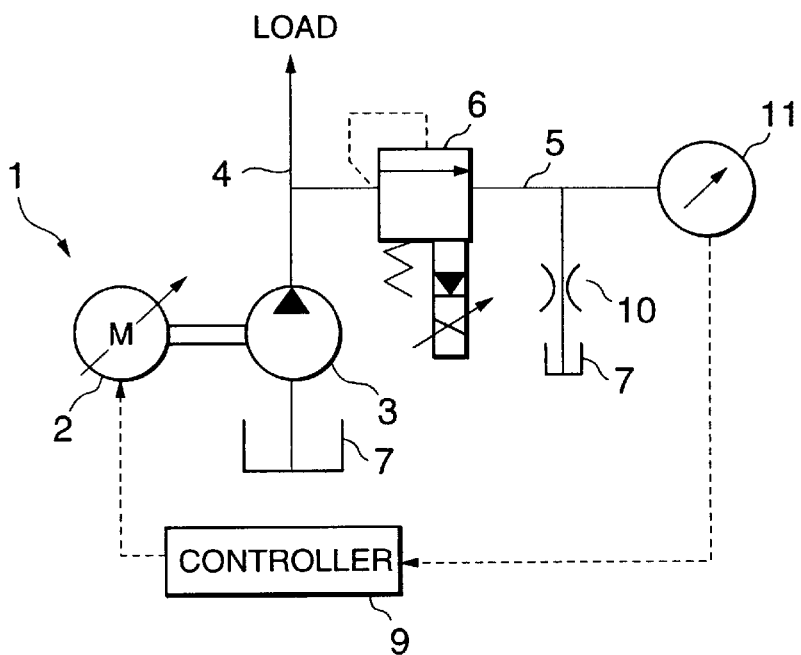
FIG. 6 is similar to FIG. 1, but showing a fourth embodiment of this invention.

The fourth embodiment shown in FIG. 6 is a case where the relief pressure of the relief valve 6 is made to be variable in the case of the aforesaid second embodiment.

Finally, a fifth embodiment of the invention will be described referring to FIGS. 7 and 8.

This embodiment is an example where the electric pump 1 of the fourth embodiment is applied to a hydraulic circuit of a continuously variable transmission for a vehicle.

Figure 7:
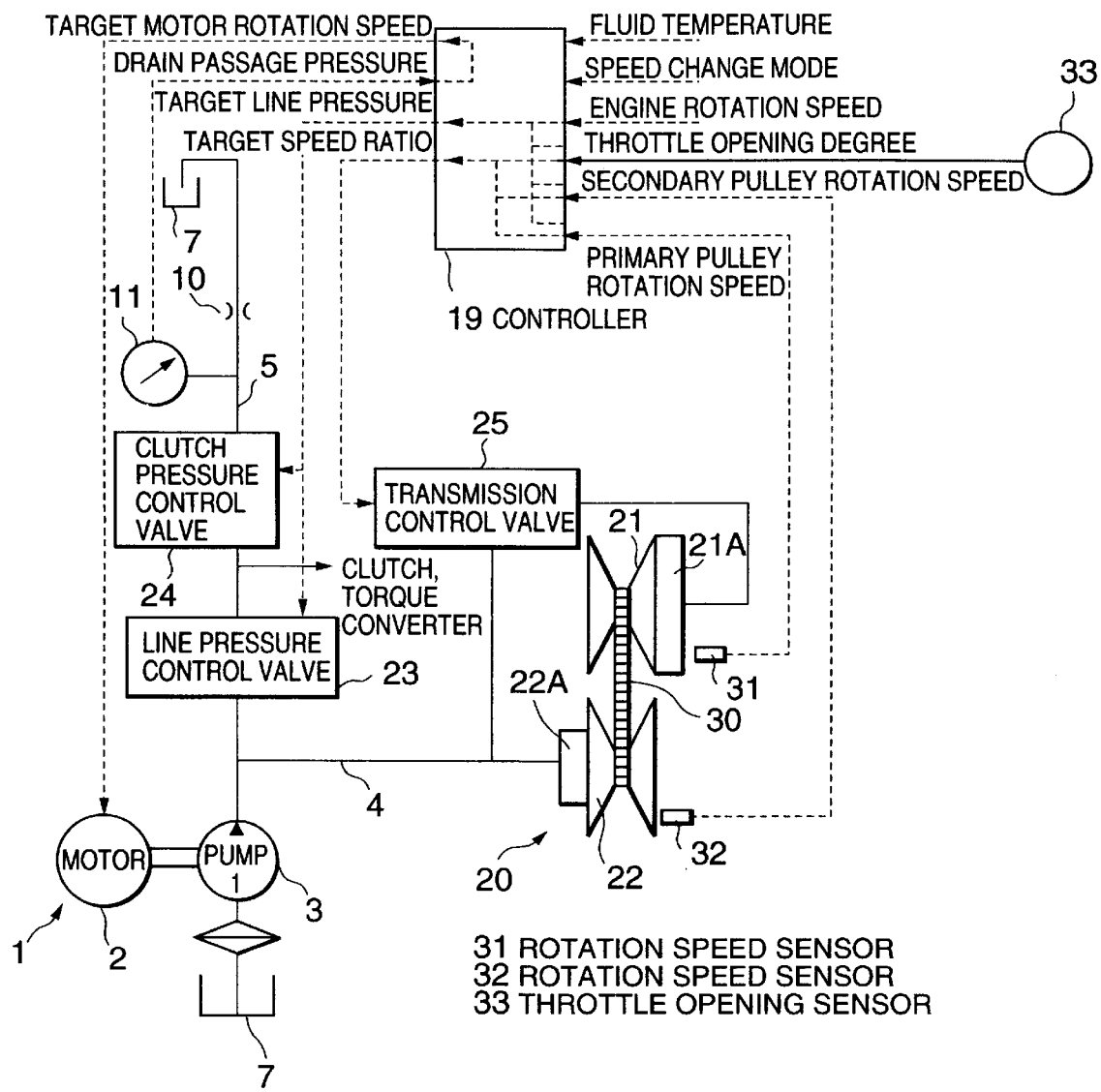
FIG. 7 is a schematic diagram of an electric pump controller according to a fifth embodiment of this invention.
Figure 8:
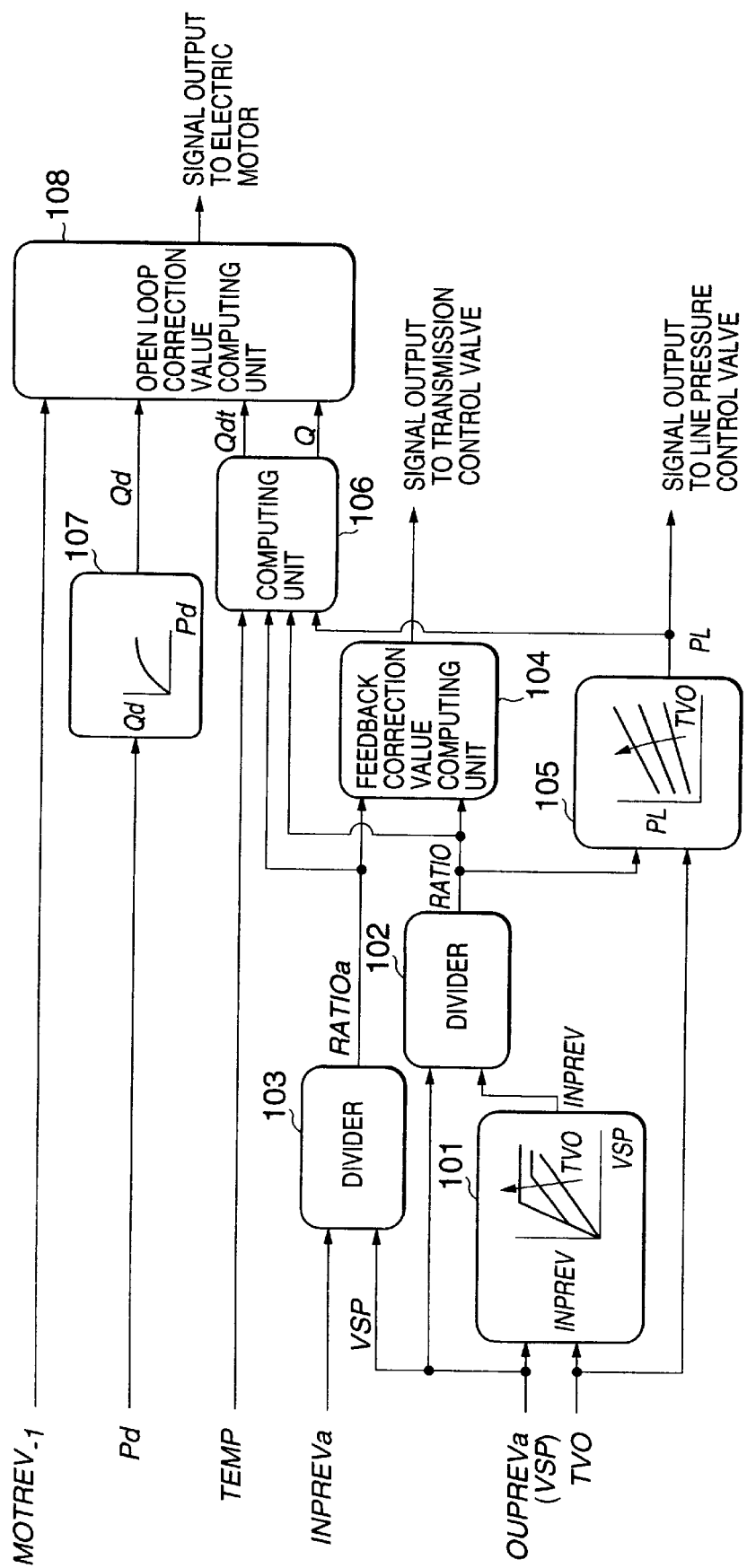
FIG. 8 is a block diagram describing the control of the controller according to the fifth embodiment.

Referring to FIG. 7, a belt type continuously variable transmission (CVT) 20 transmits the rotation of an engine at an arbitrary speed change ratio to drive wheels of a vehicle via a belt 30 looped around a primary pulley 21 connected to the engine and a secondary pulley 22 connected to the drive wheels.

The primary pulley 21 varies a contact radius with the belt 30 according to the fluid pressure of an fluid chamber 21A, and the secondary pulley 22 varies the contact radius with the belt 30 according to the fluid pressure of an oil chamber 22A. These fluid pressures are supplied from the electric pump 1.

First, the discharge pressure of the electric pump 1 is adjusted to a predetermined pressure by a line pressure control-valve 23, and supplied, as a line pressure, to a transmission control valve 25 and the oil chamber 22A.

The line pressure control-valve 23 supplies part of the discharged fluid of the electric pump 1 to a clutch and torque converter due to the action of a duty solenoid in response to a target line pressure output by the controller 19 as a pulse signal.

The transmission control valve 25 controls the line pressure to a fluid pressure corresponding to the target speed ratio determined by the controller 19.

For this purpose, the transmission control valve 25 comprises a step motor which responds to an output signal of the controller 19 and a spool valve of which the pressure is varied by the step motor.

The pressure supplied to the clutch and torque converter is controlled by a clutch pressure control valve 24.

The clutch pressure control valve 24 corresponds to the relief valve of the fourth embodiment, and when the fluid pressure supplied to the clutch and torque converter exceeds a preset relief pressure, part of the operating fluid is recirculated to the oil tank 7 via the drain 5. In the drain 5, an orifice 10 and pressure sensor 11 are provided as in the fourth embodiment. The relief pressure is dynamically varied according to a predetermined equation relative to the variation of the target line pressure so as to obtain a low pressure relative to the target line pressure. The continuously variable transmission 20, clutch and torque converter corresponds to the load of the fourth embodiment.

The line pressure due to the line pressure control valve 23, the pressure of the fluid chamber 21A due to the transmission control valve 25, the relief pressure of the clutch pressure control valve 24 and rotation speed of electric motor 2 are controlled by output signals from the controller 19.

To perform this control, a rotation speed sensor 31 which detects the rotation speed of the primary pulley and a rotation speed sensor 32 which detects the rotation speed of the secondary pulley 22 are attached to the continuously variable transmission 20, and these detection signals are input to the controller 19.

Also, the pressure detected by the above-mentioned pressure sensor 11, fluid temperature TEMP of the hydraulic circuit detected by a sensor, not shown, speed change mode signal showing a speed change mode, engine rotation speed, and throttle opening detected by a throttle opening sensor 33, are respectively input as signals to the controller 19.

Next, referring to FIG. 8, the above control process performed by the controller 19 based on the input signals will be described.

First, the controller 19 determines a target primary pulley rotation speed INPREV from a throttle opening degree TVO as an engine load and vehicle speed VSP by looking up a prestored speed change map 101.

The vehicle speed VSP is found by multiplying a detected rotation speed OUPREVa of the secondary pulley 32 connected to the drive wheels by a constant.

The controller 19 also computes a target speed ratio RATIO in a divider 102 from the target primary pulley rotation speed INPREV and detected secondary pulley rotation speed OUPREVa.

On the other hand, a real speed ratio RATIOa is computed in a divider 103 from a detected primary pulley rotation speed INPREVa and the detected secondary pulley rotation speed OUPREVa.

A feedback computation is applied in a feedback correction value computing unit 104 based on a deviation of the real speed ratio RATIOa from the target speed ratio RATIO so as to calculate a command value to the step motor of the transmission control valve 25, and a corresponding signal is output.

The controller 19 also determines a target line pressure PL based on the target speed change ratio RATIO and throttle opening degree TVO by looking up a preset line pressure map 105, and this is output to the line pressure control valve 23. The controller 19 determines a target relief pressure of the clutch pressure control valve 24 using the predetermined equation. The determined target relief pressure, which is lower than the target line pressure PL as described heretofore, is then output to the clutch pressure control valve.

On the other hand, the controller 19 calculates a real drain flowrate based on the drain pressure detected by the pressure sensor 11 and based on the characteristics of the orifice 10 by looking up a prestored map 107 of orifice characteristics.

Also, in a computing unit 106, a target drain flowrate Qdt and flowrate Q of the speed change control valve 25 required to make the real speed ratio RATIOa coincide with the target speed ratio RATIO are calculated in the computing unit 106 from the real speed ratio RATIOa, target speed ratio RATIO, target line pressure PL and fluid temperature TEMP.

The flowrate 0 of the transmission control valve 25 necessary to make the real speed ratio RATIOa of the continuously variable transmission 20 coincide with the target speed ratio RATIO may be obtained by the following method.

If the flowrate of the operating fluid flowing into the fluid chamber 21A is $Q_1$, and the flowrate of operating fluid flowing into the fluid chamber 22A is $Q_2$, the flowrates Q, $Q_1$ and $Q_2$ may be expressed by the following equations.

$$Q = Q_1 + Q_2$$
$$Q_1 = A_1 \cdot (R_1' - R_1) \cdot \frac{2 \cdot \tan\theta}{\Delta t}$$
$$Q_2 = A_2 \cdot (R_2' - R_2) \cdot \frac{2 \cdot \tan\theta}{\Delta t}$$

where, $Q_1$=flowrate of operating fluid flowing into fluid chamber 21A, $Q_2$=flowrate of operating fluid flowing into fluid chamber 21B, $A_1$=pressure-receiving surface area of piston supporting primary pulley, $A_2$=pressure-receiving surface area of piston supporting secondary pulley, $\theta$=angle of pulley groove, $R_1$=contact radius of primary pulley and belt corresponding to real speed ratio RATIOa, $R_2$=contact radius of secondary pulley and belt corresponding to real speed ratio RATIOa, $R_1'$=contact radius of primary pulley and belt corresponding to target speed ratio RATIO, $R_2'$=contact radius of secondary pulley and belt corresponding to target speed ratio RATIO, and $\Delta t$=time required to vary real speed ratio to target speed ratio.

The transmission control valve 25 has such a construction that, during the upshift of the continuously variable transmission 20, operating fluid which flows out of the fluid chamber 22A is supplied to the fluid chamber 21A via the transmission control valve 25, whereas during the downshift of the continuously variable transmission 20, operating fluid which has flowed out from the fluid chamber 21A is not supplied to the fluid chamber 22A, but is drained to the tank 7 from the transmission control valve 25.

Therefore, when $Q_1$ has negative value, the calculation is performed setting $Q_1$=0.

The contact radii $R_1$, $R_2$, $R_1'$, $R_2'$ are calculated by the following equation.

$$R_1 = \frac{\sqrt{a^2 \cdot \pi^2 \cdot (1 + \text{RATIO}a)^2 - 4 \cdot a \cdot (1 - \text{RATIO}a)^2 \cdot (2 \cdot a - l)} - \pi \cdot a \cdot (\text{RATIO}a)}{2 \cdot (1 - \text{RATIO}a)^2}$$

-continued $$R'_1 = \frac{\sqrt{a^2 \cdot \pi^2 \cdot (1 + \text{RATIO})^2 - 4 \cdot a \cdot (1 - \text{RATIO})^2 \cdot (2a - l)} - \pi \cdot a \cdot (1 + \text{RATIO})}{2 \cdot (1 - \text{RATIO})^2}$$

$$R_2 = \text{RATIO}a \cdot R_1$$

$$R'_2 = \text{RATIO} \cdot R'_1$$

where, a=distance between primary pulley and secondary pulley, and l=belt length.

To simplify the calculation, the relation between for example the speed ratio and the contact radii of the pulleys may be prestored in the controller 19 as a map, and the contact radii $R_1$, $R_2$, $R_1'$, $R_2'$ found from the speed ratios RATIO and RATIOa by looking up this map.

An open loop correction value computing unit 108 computes an open loop correction value related to the rotation speed of the electric motor 2 based on the flowrate 0 of the transmission control valve 25 calculated as above. The computing unit 108 calculates the deviation of the real drain flowrate Qd and target drain flowrate Qdt, and calculates a feedback correction value related to the rotation speed of the electric motor 2 based on this deviation and the target rotation speed $\text{MOTREV}_{-1}$ of the electric motor 2 output on the immediately preceding occasion when the control process was executed.

A target rotation speed MOTREV is then determined by the a following equation based on the feedback correction value and open loop correction value, and a corresponding command signal is output to the electric motor 2.

MOTREV=$\text{MOTREV}_{-1}$+open loop correction value+ feedback correction value The target rotation speed MOTREV can be calculated using only the feedback correction value without using the open loop correction value, but the response characteristics of the electric pump 1 are improved by using the open loop correction value in addition.

The contents of Tokugan Hei 10-107855, with a filing date of Apr. 17, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A controller of an electric pump for discharging a pressurized fluid, comprising:

a relief valve provided with a drain for draining part of the pressurized fluid when the pressure of the pressurized fluid exceeds a predetermined relief pressure, a sensor for detecting a drain flowrate of said drain, and a microprocessor programmed to feedback control a rotation speed of said electric pump so that said drain flowrate coincides with a predetermined target flowrate.

2. A controller as defined in claim 1, wherein said sensor comprises an orifice provided in said drain passage, and a sensor for detecting the pressure of the drain passage between said relief valve and said orifice.

3. A controller as defined in claim 2, wherein said microprocessor is programmed to control the rotation speed of said electric pump so that the pressure of said drain passage coincides with a predetermined target pressure.

4. A controller as defined in claim 1, wherein said relief valve is provided with a function to vary said predetermined relief pressure.

5. A controller as defined in claim 1, wherein said microprocessor is further programmed to modify said predetermined target flowrate according to said predetermined relief pressure.

6. A controller of an electric pump for discharging a pressurized fluid, comprising:

a relief valve provided with a drain for draining part of the pressurized fluid when the pressure of the pressurized fluid exceeds a predetermined relief pressure, a sensor for detecting a drain flowrate of said drain, and means for feedback controlling a rotation speed of said electric pump so that said drain flowrate coincides with a predetermined target flowrate.

7. A control method of an electric pump for discharging a pressurized fluid, comprising:

draining part of said pressurized fluid via a relief valve when a pressure of said pressurized fluid exceeds a predetermined relief pressure, detecting a drain flowrate of said relief valve feedback controlling a rotation speed of said electric pump so that said drain flowrate coincides with a predetermined target flowrate.

8. A hydraulic pressure controller of a continuously variable transmission of a vehicle, said vehicle having a clutch, comprising:

an electric pump comprising a discharge passage for discharging a pressurized fluid, a line pressure control valve provided in said discharge passage, said line pressure control valve supplying part of said fluid to said continuously variable transmission, a relief valve provided downstream of said line pressure control valve in said discharge passage, said relief valve comprising a drain passage for draining part of said pressurized fluid so as to maintain the pressure of said discharge passage downstream of said line pressure control valve at a predetermined relief pressure while supplying part of said pressurized fluid to said clutch, a sensor for detecting a flowrate of said drain passage, and a microprocessor programmed to:

calculate a feedback correction value of the rotation speed of said electric pump based on a difference between the flowrate of said drain passage and a predetermined flowrate, and control the rotation speed of said electric pump based on said feedback correction value.

9. A hydraulic pressure controller as defined in claim 8, wherein said sensor comprises an orifice provided in said drain passage, and a sensor for detecting the pressure of the drain passage between said relief valve and said orifice.

10. A hydraulic pressure controller as defined in claim 8, wherein said controller comprises a sensor for detecting an input rotation speed of said continuously variable transmission, a sensor for detecting an output rotation speed of said continuously variable transmission and a sensor for detecting an engine load, and said microprocessor is further programmed to calculate a target speed ratio of said continuously variable transmission based on said engine load and said output rotation speed, calculate a true speed ratio of said continuously variable transmission based on the input rotation speed and output rotation speed, calculate an open loop correction value of the rotation speed of said electric pump based on a difference between said target speed ratio and said true speed ratio, and control the rotation speed of said electric pump based on said open loop correction value and the feedback correction value.

* * * * *